United States Patent
Rozema, Jr. et al.

[11] Patent Number: 5,890,940
[45] Date of Patent: Apr. 6, 1999

[54] LAMP RECYCLING APPARATUS AND METHOD FOR DOING THE SAME

[76] Inventors: Gerald Rozema, Jr., 4653 Grenadier, SW., Grand Rapids, Mich. 40509; Fred R. Rozema, 3018 Rush Creek Dr., SW., Byron Center, Mich. 49315

[21] Appl. No.: 784,714

[22] Filed: Jan. 16, 1997

Related U.S. Application Data

[60] Provisional application No. 60/010,270 Jan. 19, 1996.

[51] Int. Cl.$^6$ .................................................. B02C 19/12
[52] U.S. Cl. ................................................ 445/2; 241/99
[58] Field of Search ................................... 445/2; 241/99

[56] References Cited

U.S. PATENT DOCUMENTS

| | | |
|---|---|---|
| 2,593,657 | 4/1952 | Coon et al. .............................. 241/99 X |
| 5,042,724 | 8/1991 | Perry . |
| 5,092,527 | 3/1992 | Perry et al. . |
| 5,106,598 | 4/1992 | Cogar . |
| 5,360,169 | 11/1994 | Köhler . |
| 5,375,774 | 12/1994 | Perry . |
| 5,388,773 | 2/1995 | Perry . |
| 5,586,730 | 12/1996 | Mortrud ................................. 241/99 X |

Primary Examiner—Kenneth J. Ramsey
Attorney, Agent, or Firm—Rader, Fishman, Grauer & McGarry

[57] ABSTRACT

A device (10) for processing used light bulbs containing gases and powdered coatings in order to separate the gases and coatings from the bulb housing materials. The device (10) includes a screw-type auger (44) journaled within an elongated inclined cylindrical housing (20) which performs the fracturing and separating actions assisted by a vacuum filtration system (14). The invention comprises a specially-shaped fin configuration for the auger (44) to create additional turbulence within the cylindrical housing (20) to ensure that any hazardous vapors or coatings are fully removed from the glass housing.

16 Claims, 4 Drawing Sheets

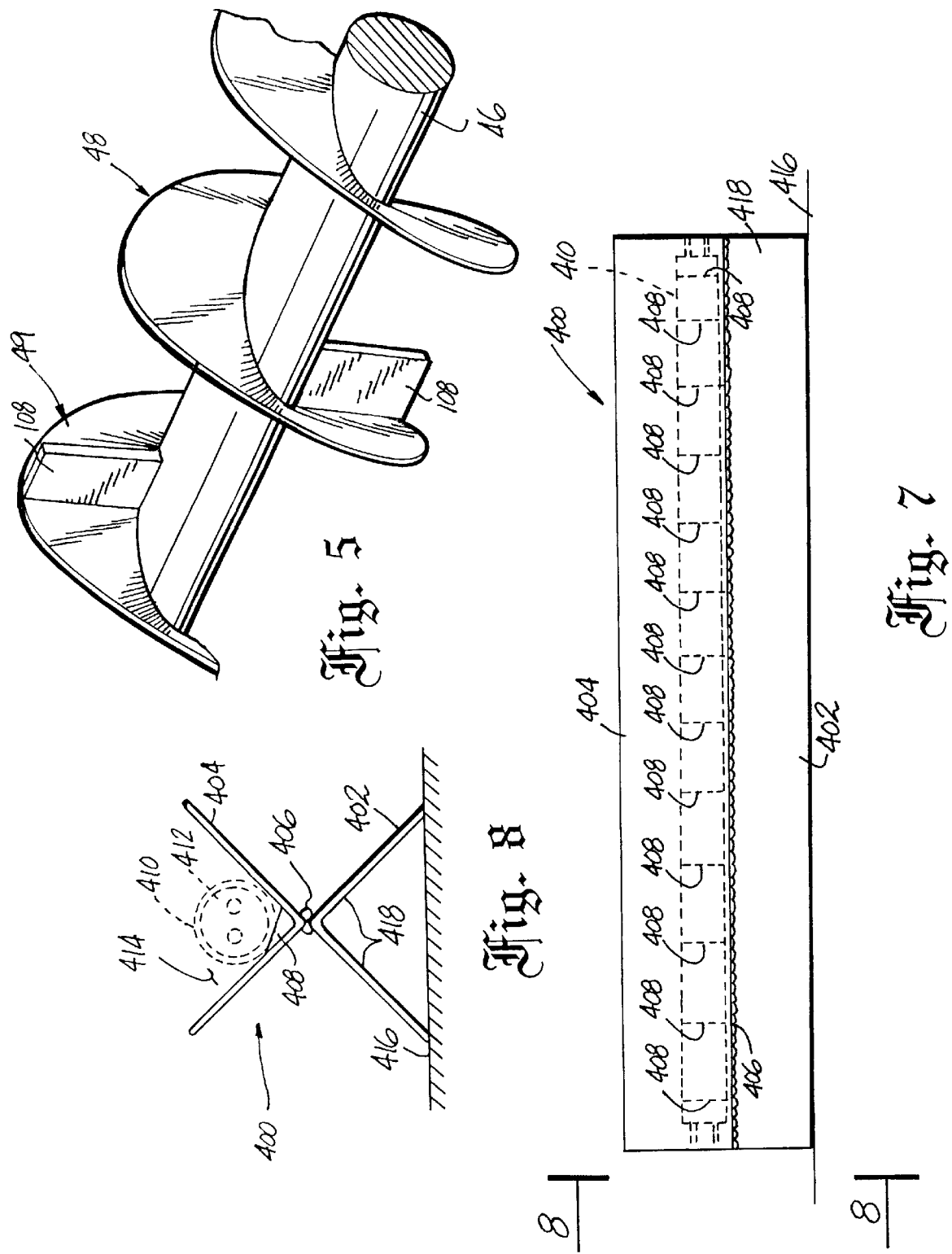

LAMP RECYCLING APPARATUS AND METHOD FOR DOING THE SAME

CLAIM OF PRIORITY

The application claims priority pursuant to 35 U.S.C. § 119 of U.S. provisional patent application Ser. No. 60/010,270, filed Jan. 19, 1996.

BACKGROUND OF THE INVENTION

1. Field of the Invention

This invention relates to the recycling or reclamation of used light bulbs. More particularly, this invention relates to a system for recycling or reclamation of used glass light bulbs of the type containing toxic gases or other toxic substances by crushing the bulbs and separating the toxic substances from the resulting crushed glass.

2. Description of Related Art

Fluorescent light bulbs are formed from sealed tubular glass housings which contain a volume of gas, such as mercury or other light-conductive medium. Often, the interior surface of the glass housing is coated with a layer of phosphor powder which aids in the uniform distribution of light within the tubular housing. The gas and the powdered coating often comprise toxic materials.

To dispose of used fluorescent light bulbs, it has become customary to crush them into small pieces. However, during the fracture process, toxic materials may escape to the environment or remain coated to the glass housing during subsequent disposal. It is desirable to separate the toxic materials in or on the tubular housing to a sufficient degree to allow the crushed glass to be recycled or disposed free of toxic or hazardous materials, and to separately capture the hazardous substances.

U.S. Pat. No. 5,388,773 to Perry, issued Feb. 14, 1995, discloses a device in which the fractured glass particles of a fluorescent bulb are continuously mixed in surface contact with each other to abrade phosphors from the surfaces of the glass particles. The small phosphor particles are air-stripped from the fractured glass particulates in a separate stripping chamber. Machines such as that disclosed in the Perry '773 patent have improved the efficiency and effectiveness of the recovery of fluorescent light bulbs. But there remains a need for further improved efficiencies in the separation of glass particulates, powder coatings and vapors included therein. Further, lamp recycling machines are often large, stationary objects which require that any bulbs to be recycled must be sent to the location of the machine, often at large expense because the bulbs must be sent as hazardous materials due to their content.

SUMMARY OF THE INVENTION

The invention relates to an apparatus for separating components of light bulbs of the type having an elongated glass tube containing phosphors in gaseous or powder form. The apparatus comprises a receiving chamber, an enclosed housing in communication with the receiving chamber, an inclined auger within the housing having a longitudinal axis and a helical screw, and at least one filter in communication with the housing wherein turbulent air flow is generated in the housing. The invention comprises an improvement to the apparatus wherein the auger has fins on the helical screw within the pitch of some of the threads and which extend generally parallel to the longitudinal axis of the auger.

The apparatus is preferably mounted to a trailer for mobility. The fins on the auger preferably extend between a predetermined pitch length between successive threads. The fins can preferably extend outwardly from the shaft of the auger and be formed of sector tabs which extend outwardly from the radial periphery of the threads, be mounted to the shaft and to the threads, and be disposed at 90° and 180° intervals around the shaft.

The apparatus can further comprise a hammer mill located within the receiving chamber. The hammer mill preferably comprises a drum rotatably mounted within the receiving chamber, at least one vane extending radially outwardly from the drum, and a motor operably connected to the drum for imparting rotational motion thereto. The receiving chamber preferably has at least one block extending inwardly from a wall of the chamber. The drum is preferably operably connected to the motor by an endless belt.

In another aspect, the invention relates to a method for separating components of light bulbs having an elongated glass tube containing phosphors in gaseous or powder form which preferably comprises the steps of providing an enclosed housing with an inclined auger having a longitudinal axis and a helical screw, the auger having fins on the helical screw within the pitch of some of the threads, actuating the auger and placing the elongated tube within the housing wherein the auger will fracture the tube and in conjunction with the fins will abrade the powder from the broken pieces, simultaneously generating turbulent airflow within the housing and extracting the air from the housing, filtering particulates and toxic gases from the air, and collecting and disposing of the fractured glass pieces.

The method can preferably comprise the additional steps of mounting the enclosed housing and conducting the process on a movable trailer or scoring any exterior coating on the elongated tube prior to fracturing the tube and fracturing the tube in a hammer mill prior to placing the tube in the auger.

In yet another aspect, the invention relates to an apparatus for scoring a plastic coating on at least a portion of an outer surface of a light bulb of the type having an elongated glass tube which comprises a body defining a cradle supported by a pair of legs, the cradle comprising a base portion and a bulb-receiving area and at least one blade mounted to the base portion having a cutting surface extending into the bulb-receiving area. The legs of the body are preferably defined by an elongated V-shaped member wherein the cradle is an elongated V-shaped member and the base portion thereof is a vertex portion of the V-shaped member. At least one blade is preferably mounted to the vertex portion of the V-shaped member. The body is preferably formed by a pair of opposed elongated V-shaped members mounted together at a vertex portion of each member. Several blades are preferably mounted in a longitudinally spaced relationship. The cutting surface of the at least one blade is preferably inclined relative to a horizontal plane.

In a further aspect, the invention also relates to a method for scoring a plastic coating on at least a portion of an outer surface of a light bulb of the type having an elongated glass tube which preferably comprises the steps of providing a body defining a cradle supported by a pair of legs, the cradle preferably comprising a base portion and a bulb-receiving area, providing at least one blade mounted to the base portion having a cutting surface extending into the bulb-receiving area, placing an elongated light bulb having a plastic coating thereon into the cradle and onto the cutting surface of the at least one blade, and rotating the elongated light bulb about a longitudinal axis while providing a force against the light bulb toward the cutting surface of the at least one blade. The rotation of the elongated light bulb and the associated force preferably causes the at least one blade to score the plastic coating on the light bulb.

BRIEF DESCRIPTION OF THE DRAWINGS

The invention will now be described with reference to the drawings wherein:

FIG. 5 is a fragmentary perspective view of a fourth embodiment of the auger shown in FIG. 1;

FIG. 7 is a side elevational view of a device for scoring a plastic coating on an elongated fluorescent bulb prior to insertion into the apparatus of FIGS. 1 and 6; and FIG. 8 is an end view of the lamp scoring device taken along lines 8—8 of FIG. 7.

DESCRIPTION OF THE PREFERRED EMBODIMENTS

Figure 1:
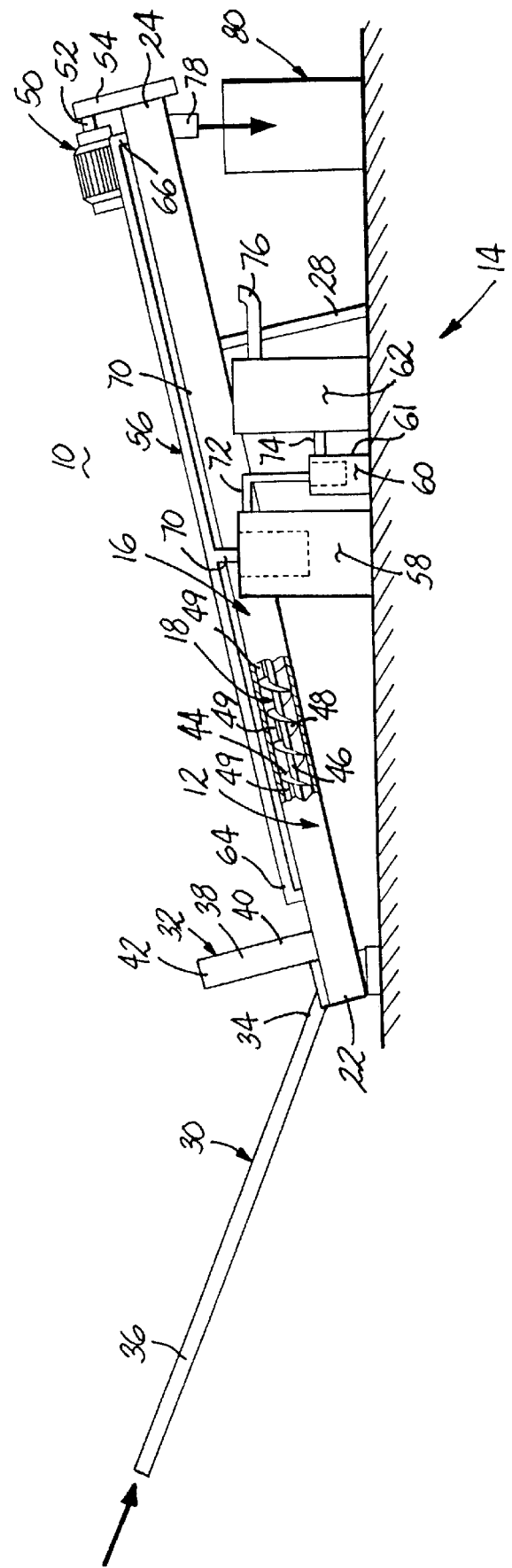
FIG. 1 is an overall diagrammatic side view of a first embodiment of a lamp recycling apparatus according to the invention provided with a broken away section revealing a screw-type auger used to crush and transport the fluorescent bulb materials.

Referring now to the drawings and to FIG. 1 in particular, a lamp recycling apparatus 10 is shown comprising a main body 12 and a filtration device 14. Although the apparatus 10 is shown for use with conventional elongated fluorescent bulbs, other types of vapor-filled lamps can be recycled with this apparatus without departing from the spirit of this invention.

The main body 12 comprises a housing 16 and an auger assembly 18. The housing 16 is an elongated cylindrical tube 20 having a proximal end 22 and a distal end 24 angularly supported on first and second legs 26 and 28, respectively. The first leg 26 comprises a short block-like base which is mounted to the proximal end 22 of the cylindrical housing 20. The second leg 28 is mounted toward the distal end 24 of the cylindrical tube 20 which maintains the distal end 24 at a desired height above the ground to incline the tube 20.

The housing 16 further includes an inlet tube 30 and a shock absorber 32. The inlet tube 30 comprises an elongated cylindrical tube defining a receiving chamber of a diameter sufficient to receive a conventional fluorescent light bulb tube. The inlet tube 30 has a first end 34 and a second end 36. The first end 34 is mounted to the proximal end 22 of the cylindrical housing 20 so that the receiving chamber of the inlet tube 30 is in communication with the interior of the elongated cylindrical tube 20. The second end 36 of the inlet tube 30 includes a partial seal (not shown) to help retain a vacuum suction pressure within the housing as will be explained later. In addition, the second end 36 includes a counter (not shown) on the inlet tube 30 which increments when a used bulb is deposited within the inlet tube 30. Such a counter allows an operator to monitor the useful lifetime of the device 10 and the likely integrity of any filter elements contained therein. The shock absorber 32 is a cylindrical shell 38 mounted at a first end 40 to the cylindrical tube 20 adjacent the mounting of the first end 34 of the inlet tube 30 adjacent the proximal end 22 of the cylindrical tube 20 so that a second end 42 of the shock absorber 32 extends upwardly therefrom. The shock absorber 32 is hollow and in communication with the interior of the housing 16. The shock absorber 32 further includes a flexible membrane installed over the second end 42 thereof to absorb a pressure wave generated by the fracture of a pressurized light bulb.

The auger assembly 18 comprises a screw-type auger 44 having a shaft 46 and a helical screw 48 mounted thereto. Intermittently spaced within the pitch of the screw 48 are several axial fins 49. The shaft 46 is journaled within the cylindrical tube 20 at the proximal end 22 and the distal end 24 for rotational motion therein. A motor 50 is mounted at the distal end 24 of the cylindrical tube 20 in any conventional manner and is provided to impart rotary motion to the auger 44. It has been found that a preferable motor 50 will provide at least 1½ horsepower to the auger 44. The motor 50 includes an output shaft 52 which is rotated upon actuation of the motor 50. The above-described rotary motion is imparted to the auger 44 in any conventional transfer mechanism such as by belts, chains, gears, pulleys etc. A shroud shown generally at 54 is mounted over the transfer mechanism for protection.

The filtration assembly 14 comprises an inlet conduit 56, a first filter 58, a second filter 60, a vacuum source 61, and a hazardous materials filter 62, all fluidly connected and designed to filter successively smaller particles which enter therein. The inlet conduit 56 comprises first and second inlet ports 64 and 66, a connector tube 68 and an outlet port 70. The first and second inlet ports 64 and 66 are sealingly mounted over apertures in the cylindrical tube 20 adjacent the proximal end 22 and the distal end 24, respectively, of the cylindrical tube 20. The inlet ports 64 and 66 essentially comprise oppositely-disposed right-angle cylindrical tubes connected to the cylindrical tube 20 at one end and to the connector tube 68 at the other end. The connector tube 68 comprises an elongated tube which extends longitudinally along the cylindrical housing 20 and into the outlet port 70. The outlet port 70 is located at a central portion of the connector tube 68 and is sealingly connected to an upper portion of the first filter 58. The first filter 58 is preferably of the cyclone type, provided with a pleated filter for trapping larger phosphate powder and silicate particles and mounted on a 55-gallon or greater drum. The first filter 58 has an outlet conduit 72 extending to the second filter 60. The second filter 60 preferably includes at least a 2¾ horsepower vacuum motor capable of moving at least 115 cubic feet per minute and provided with a HEPA filter. Additionally, the second filter 60 includes an outlet conduit 74 which extends to the hazardous materials filter 62. The hazardous materials filter 62 is preferably at least a 55-gallon Calgon-activated carbon filter with at least 200 pounds of HGR carbon designed for mercury removal.

The filter 62 is designed to absorb at least 40 pounds of mercury which corresponds to a volume contained in approximately 750,000 fluorescent tubes. Mercury contaminated carbon can then be sent to a mercury recycle facility after a sufficient volume of mercury has been captured. An upper portion of the hazardous materials filter 62 includes an outlet spout 76 which connects the exhaust of the hazardous materials filter 62 with the atmosphere. Exhaust gases can be tested for mercury with a Sensidyne Gastec Detector Tube #40 to ensure that no detectable mercury exists in the exhaust gas stream exiting the outlet spout 76.

Finally, the distal end 24 of the elongated cylindrical tube 20 includes a cylindrical outlet port 78 which extends vertically and downwardly from the interior of the cylindrical tube 20. A collection receptacle, such as that shown at 80 in FIG. 1, is placed beneath the outlet port 78 of the cylindrical tube 20 to collect "cleaned" non-hazardous materials for recycling.

In operation, a used light bulb such as an elongated fluorescent tube containing, for example, a volume of potentially toxic gas and a coating layer of phosphor or similar material is axially inserted within the inlet tube 30 at the second end 36 thereof. During the insertion of the fluorescent tube within the inlet tube 30, the motor 50 is actuated and providing rotational movement to the auger 44. In addition, the filtration assembly 14 is actuated to provide a strong vacuum pull through the first and second filters 58 and 60. This suction is transmitted through the port 70 and connector tube 68 to the first and second ports 64 and 66 which, in turn, creates a turbulent air flow under negative pressure within the interior of the cylindrical tube 20. This suction within the cylindrical tube 20 extends to the inlet tube 30 which tends to pull the fluorescent light tube within the second end 36 of the inlet tube 30. As the light bulb exits the first end 34, it encounters the rotating auger 44 as it enters the interior of the cylindrical tube 20. The fins 49 and screw 48 of the auger 44 bear against the inserted fluorescent tube causing it to fracture. If the used fluorescent tube is positively or negatively pressurized, any resulting shock waves are absorbed by the shock absorber 32.

The fluorescent light bulb tube continues to be ground by the screw-type action of the auger 44 into its essential components: broken glass, metal contacts, the powder-like phosphor coating on the interior of the glass, and the mercury-laden or other toxic vapor formerly contained within the glass housing of the fluorescent tube. The particulate matter is conveyed upwardly and axially along the cylindrical tube 20 by the auger 44 toward the outlet port 78 to be deposited within the receptacle 80 through the outlet port 78.

The auger assembly 18 and the filtration assembly 14 combine to effectively remove the mercury vapor and powder-like phosphor material from the glass so that the glass may be collected and recycled without fear of contamination by these hazardous materials which may be found in the vapor or the phosphor powder. The mercury vapor or other toxic vapor formerly contained within the glass housing of the fluorescent light bulb tube is suctioned by the filtration assembly 14 through the first and second inlet ports 64 and 66 and into the connector tube 68. The mercury vapor travels through the filtration assembly 14 and into the hazardous materials filter 62 where it is safely absorbed therein. The tumbling action imparted to the glass pieces by the fins 49 effectively brushes the phosphor powder off the glass pieces into suspension in the air to be continuously extracted from the housing 16 by the filtration assembly 14.

Figure 4:
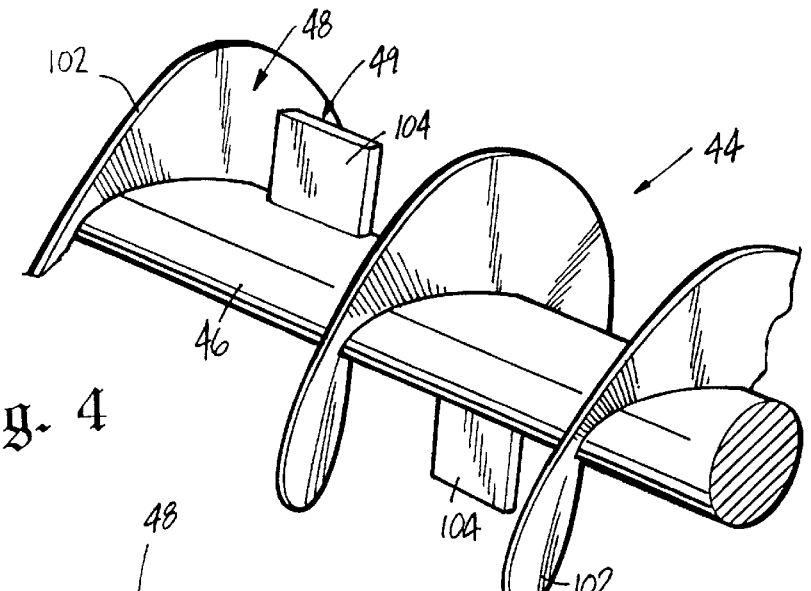
FIG. 4 is a fragmentary perspective view of a third embodiment of the auger shown in FIG. 1.
Figure 3:
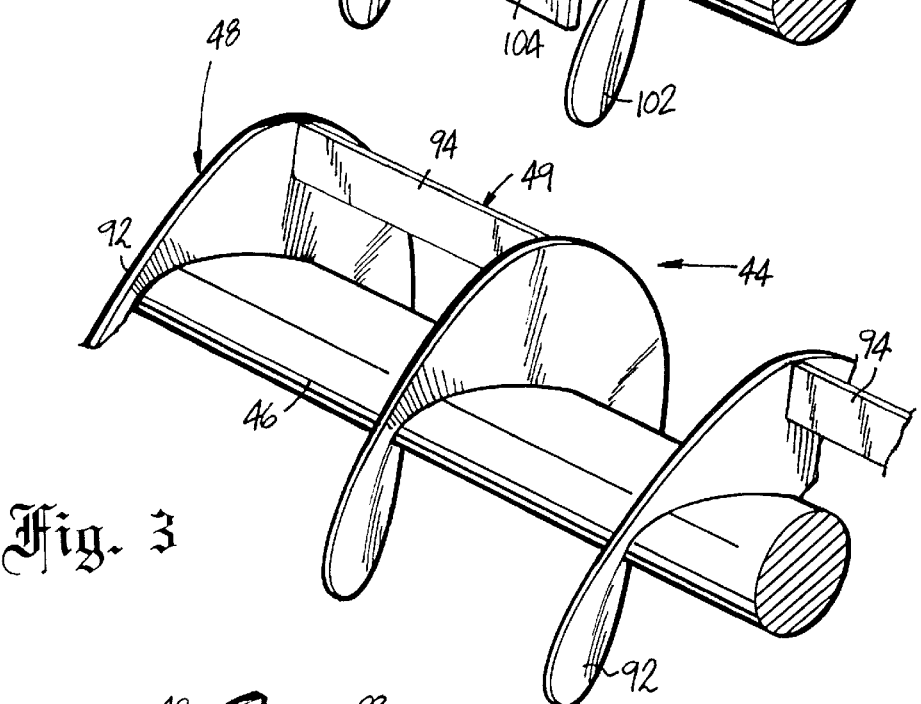
FIG. 3 is a fragmentary perspective view of a second embodiment of the auger shown in FIG. 1.
Figure 2:
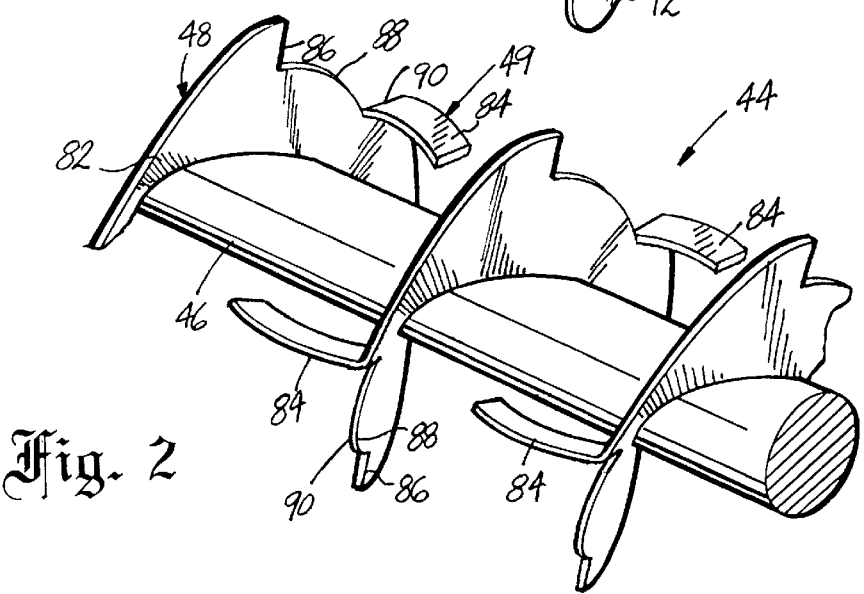
FIG. 2 is a fragmentary perspective view of a first embodiment of the auger shown in FIG. 1.

Further detail of the fins 49 is shown in FIGS. 2–4. Turning to FIG. 2, a first embodiment of the fin 49 of the auger 44 is shown. The helically-wound radially-extending screw 48 is provided with one or more axially-directed fins 49 located within each pitch of the screw 48. The fin 49 is made by first cutting the screw 48 radially inwardly at 86 and then circumferentially at 88 to form a substantially rectangular flap 84. The flap 84 is then bent around a radial axis 90 disposed adjacent an innermost portion of the circumferential cut 88. The flap 84 is either bent axially forwardly or rearwardly as shown in FIG. 2. It has been found that positive results are achieved with two or three flaps 84 disposed within each pitch of the screw 48 which are alternately bent forwardly and rearwardly parallel to the shaft 46. Additional or fewer flaps 84 can be disposed within each pitch of the screw 48 without departing from the scope of this invention. It should also be noted that because the flaps 84 are cut from a portion of the helically-wound screw 48, the body of the flaps 84 includes an inherent inwardly-directed curve which further aids in creating turbulence within the interior chamber of the cylindrical housing 20. If preferred, the flaps 84 can also be bent into a straight cross section or any other cross section to further aid in the creation of additional turbulence.

Turning to FIG. 3, the auger 44 is shown with a second embodiment of the fin 49 on the helically-wound screw 48 of the shaft 46. The fin 49 comprises an axially-directed flap 94 located within and extending between each pitch of the screw 48. The flap 94 comprises an axially-curved rectangular plate in a radially-spaced relationship with respect to the shaft 46 and mounted at opposite vertical edges to the screw 48 so that an outermost horizontal edge of the flap 94 is aligned with the outermost radial edge of the screw 48. The flaps 94 can alternately be located at a lesser radial distance from the shaft 46 without departing from the scope of this invention. It has been found that positive results are achieved with a flap 94 disposed within each pitch of the screw 92 which are intermittently mounted parallel to the shaft 46 at the outermost radial edge of the screw 48. Additional or fewer flaps 94 can be disposed within each pitch of the screw 48 without departing from the scope of this invention or, if preferred, the flaps 94 can also be provided with a straight cross section or any other cross section to further aid in the creation of additional turbulence.

Turning to FIG. 4, a third embodiment of the fin 49 of the auger 44 is shown. The fin 49 comprises one or more transversely-directed flaps 104 mounted to the shaft 46 between each pitch of the screw 48. The flap 104 comprises a substantially rectangular plate which extends transversely upwardly to the extent of the radial height of the screw 48. It has been found that positive results are achieved with flaps 104 disposed between each pitch of the screw 48 which are alternately mounted to oppositely-disposed portions of the shaft 46. The flaps 104 can be provided with a curved cross section to enhance the turbulence generated within the interior chamber of the cylindrical housing 20.

Turning to FIG. 5, a fourth embodiment of the fin 49 of the auger 44 is shown. The fin 49 comprises one or more transversely-directed flaps 108 mounted at one edge to the shaft 46 between each pitch 106 and at another edge to the screw 48. The flap 108 comprises a substantially rectangular plate which extends transversely upwardly to the crest of the screw 48. It has been found that positive results are achieved with flaps 108 disposed between each pitch of the screw 48 which are alternately mounted to oppositely-disposed portions of the shaft 46. The flaps 108 can be provided with a curved cross section to enhance the turbulence generated within the interior chamber of the cylindrical housing 20.

Referring to FIGS. 2–5, the fins 49 comprising either of the flaps 84, 94, 104, or 108 respectively, provide a means to substantially increase the turbulence generated in the interior of the cylindrical housing 20 when the auger 44 is rotated by the motor 50. The flaps 84, 94, 104 and 108 essentially act as "scoops" which collect and agitate any crushed glass within the cylindrical housing 20 and further abrade any coating materials remaining on the glass. This agitation action causes any powdered coating materials to be thrust into the air within the housing 20 so that it can be safely collected by the filtration assembly 14.

In a preferred embodiment, the device 10 is mobile by fitting it to a truck bed or within an enclosed trailer. The mobility of the device 10 permits its transportation to a workplace for safe disposal of used fluorescent tubes. The various elements of the device 10 are preferably fixedly mounted to a single movable chassis with lockable wheels.

Exhaust products produced by the device 10 include the particulate glass matter collected in the receptacle 80 and any exhaust gases which exit the filter 62 through the outlet spout 76. The particulate glass dispensed into the receptacle 80 can be recycled in any conventional manner. The exhaust gases exiting through the outlet spout 76 of the filter 62 can be recirculated to an inlet port of a conventional combustion engine contained within a vehicle towing the device 10 to provide a power increase to the engine and to prevent the exhaust gases from entering the atmosphere. Also, the motor 50 may be mounted elsewhere and operably connected to the auger 44, in which case the motor may be an internal combustion engine to which the exhaust gases of the device 10 may be directed.

Figure 6:
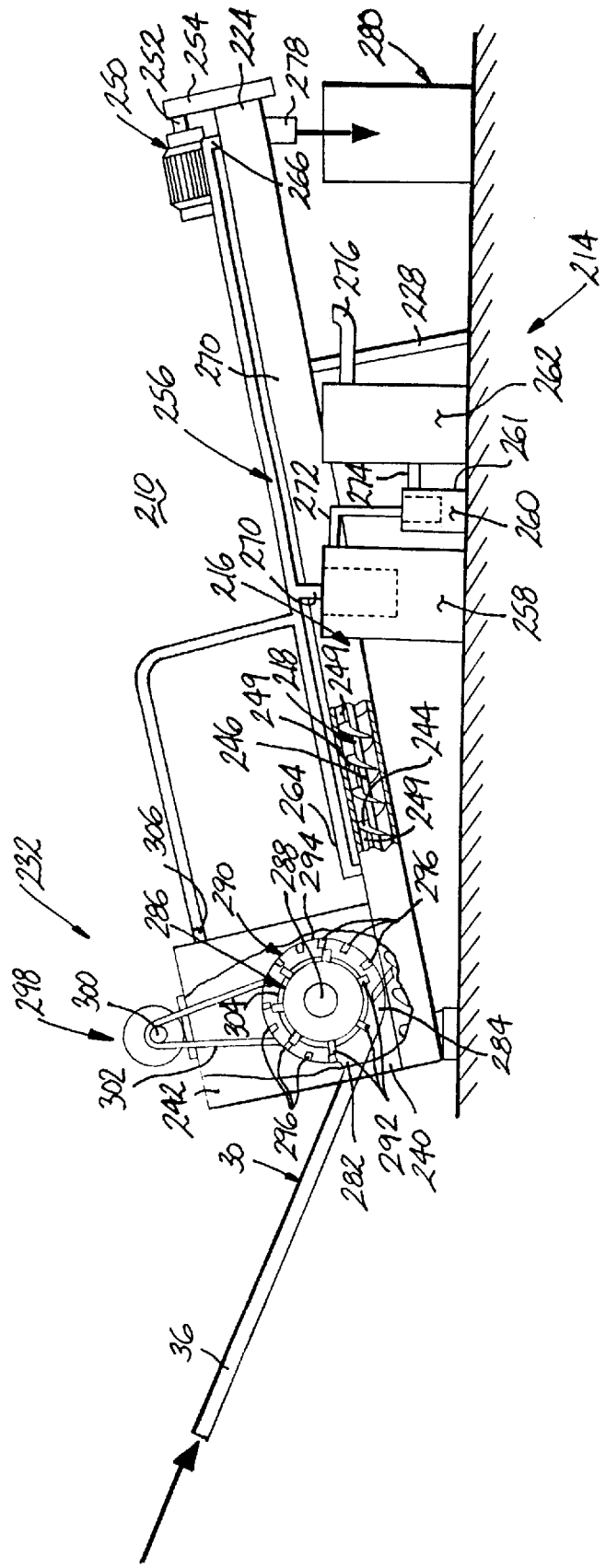
FIG. 6 is an overall diagrammatic side view of a second embodiment of a lamp recycling apparatus according to the invention.

FIG. 6 shows a second embodiment of a lamp recycling apparatus, shown generally as 210. It will be understood that reference numerals in FIG. 6 are greater by 200 for similar components than reference numerals of the first embodiment shown in FIG. 1. The lamp recycling apparatus 210 is shown comprising a main body 212 and a filtration device 214 as in the first embodiment. Although the apparatus 210 is shown for use with conventional elongated fluorescent bulbs, other types of vapor-filled lamps can be recycled with this apparatus without departing from the spirit of this invention.

The main body 212 comprises a housing 216 and an auger assembly 218. The housing 216 is an elongated cylindrical tube 220 having a proximal end 222 and a distal end 224 angularly supported on first and second legs 226 and 228, respectively. The first leg 226 comprises a short block-like base which is mounted to the proximal end 222 of the cylindrical tube 220. The second leg 228 is mounted toward the distal end 224 of the cylindrical tube 220 which maintains the distal end 224 at a desired height above the ground to incline the tube 220.

The housing 216 further includes an inlet tube 230 and a hammer mill 232. The inlet tube 230 comprises an elongated cylindrical tube defining a receiving-chamber of a diameter sufficient to receive a conventional fluorescent light bulb tube. The inlet tube 230 has a first end 234 and a second end 236. The first end 234 is mounted to the proximal end 222 of the cylindrical housing 220 so that the receiving chamber is in communication with the interior of the elongated cylindrical tube 220. The second end 236 of the inlet tube 230 includes a partial seal (not shown) to help retain a vacuum suction pressure within the housing. In addition, the second end 236 includes a counter (not shown) as discussed above.

The hammer mill 232 comprises a housing 238 mounted at a first end 240 to the cylindrical tube 220 between the first end 234 of the inlet tube 230 and the proximal end 222 of the cylindrical tube 220 so that a second end 242 of the hammer mill 232 extends upwardly therefrom. The hammer mill 232 includes an inlet port 282 and an outlet port 284. The inlet port 282 communicates with the receiving chamber of the inlet tube 230 at the first end 234 thereof. The outlet port 284 communicates with the interior of the housing 216 adjacent the proximal end 222 thereof. A drum 286 is rotatably mounted in a cylindrical chamber 290 in the housing 238 within a bearing 288. The drum 286 includes several radially-extending blades 292, preferably formed of a rigid material such as 12–14% manganese steel. The cylindrical chamber 290 is defined by a chamber wall 294 which is provided with several inwardly-extending blocks 296, preferably formed of a material of at least 60 Rockwell hardness. The blades 292 on the drum 286 and the blocks 296 on the chamber wall 294 are configured so that rotation of the drum 286 causes the blades 292 to rotate and narrowly miss contacting the blocks 296.

The hammer mill 232 further includes a motor 298 mounted to the housing 238, such as at the second end 242 thereof as shown in FIG. 6. The motor 298 is preferably a heavy-duty motor having at least 3 h.p. The motor 298 includes a drive shaft 300 which mounts an endless belt 302. The belt 302 is also mounted to a pulley portion 304 of the drum 286 so that motion imparted to the drive shaft 300 by the motor 298 is transmitted to the pulley portion 304 of the drum 286 by the belt 302. The housing 238 also includes a vacuum port 306 adjacent the second end 242 thereof which communicates with the chamber 290.

The auger assembly 218 comprises a screw-type auger 244 having a shaft 246 and a helical screw 248 mounted thereto. It will be understood that the auger 244 is configured as discussed in the previous embodiments shown in FIGS. 1–5 so that it is provided with intermittently-spaced axial fins 249 within the pitch of the screw 248. The shaft 246 is journaled within the cylindrical tube 220 at the proximal end 222 and the distal end 224 for rotational motion therein. A motor 250 is mounted at the distal end 224 of the cylindrical tube 220 in any conventional manner and is provided to impart rotary motion to the auger 244. The motor 250 includes an output shaft 252 which is rotated upon actuation of the motor 250.

The filtration assembly 214 comprises an inlet conduit 256, a first filter 258, a second filter 260, a vacuum source 261, and a hazardous materials filter 262, all fluidly connected and designed to filter successively smaller particles which enter therein. The inlet conduit 256 comprises first and second inlet ports 264 and 266, a connector tube 268 and an outlet port 270. The first and second inlet ports 264 and 266 are sealingly mounted over apertures in the cylindrical housing 220 adjacent the proximal end 222 and the distal end 224, respectively, of the cylindrical housing 220. The connector tube 268 comprises an elongated tube which extends longitudinally along the cylindrical housing 220 and into the outlet port 270. The outlet port 270 is located at a central portion of the connector tube 268 and is sealingly connected to an upper portion of the first filter 258. The outlet port 270 also communicates with the vacuum port 306 in the hammer mill housing 238 so that matter to be filtered in both the connector tube 268 and in the chamber 290 is delivered to the first filter 258 by the outlet port 270. The first filter 258, the second filter 260, and the hazardous materials filter 261 are configured and operate as discussed in the embodiment shown in FIG. 1.

Finally, the distal end 224 of the elongated cylindrical housing 220 includes a cylindrical outlet port 278 which extends vertically and downwardly from the interior of the cylindrical housing 220. A collection receptacle, such as that shown at 280 in FIG. 6, can be placed beneath the outlet port 278 of the cylindrical housing 220 to collect "cleaned" non-hazardous materials for recycling.

In operation, a used light bulb such as an elongated fluorescent tube containing, for example, a volume of potentially toxic gas and a coating layer of phosphor or similar material is axially inserted within the inlet tube 230 at the second end 236 thereof. During the insertion of the fluorescent tube within the inlet tube 230, the motors 250 and 298 are actuated to provide rotational movement to the auger 244 and drum 286, respectively. In addition, the filtration assembly 214 is actuated to provide a strong vacuum pull through the first and second filters 258 and 260 and the vacuum port 306. This suction is transmitted through the port 270 and connector tube 268 to the first and second ports 264 and 266 which, in turn, creates a turbulent air flow under negative pressure within the interior of the cylindrical tube 220 and to the chamber 290 of the hammer mill 232. This suction within the cylindrical tube 220 and the chamber 290 extends to the inlet tube 230 which tends to pull the fluorescent light tube within the second end 236 of the inlet tube 230.

As the fluorescent light bulb tube exits the first end 234, it encounters the rotating drum 286 as it enters the interior of the chamber 290 in the housing 238. The rotating blades 292 on the drum 286 bear against the inserted fluorescent tube causing it to fracture. The action of the blades 292 rotating adjacent the blocks 296 causes the tube to be ground into relatively small size particles. In addition, any toxic gases produced are drawn out of the housing 238 through the vacuum port 306. The ground matter is then deposited into the outlet port 284 of the housing 238 and into the cylindrical housing 220 adjacent the proximal end 222 thereof. The ground matter is further reduced by the auger 244 as it enters the interior of the cylindrical housing 220. The fins 249 and screw 248 of the auger 244 grind against the inserted matter.

As the fluorescent tube is ground into particulate matter by the auger 244, the fluorescent light bulb tube material typically consists of these essential components: broken glass, metal contacts, the powder-like phosphor coating on the interior of the glass, any polymeric coatings on the tube, and the mercury-laden vapor formerly contained within the glass housing of the fluorescent tube. The particulate matter is conveyed upwardly and axially along the cylindrical tube 220 by the auger 244 toward the outlet port 278 to be deposited within the receptacle 280 through the outlet port 278.

The auger assembly 218 and the filtration assembly 214 combine to effectively remove the mercury vapor and powder-like phosphor material from the glass so that the glass may be collected and recycled without fear of contamination by these hazardous materials which may be found in the vapor or the phosphor powder. The mercury vapor or other toxic vapor formerly contained within the glass housing of the fluorescent light bulb tube is suctioned by the filtration assembly 214 through the first and second inlet ports 264 and 266 and into the connector tube 268. The mercury vapor travels through the filtration assembly 214 and into the hazardous materials filter 262 where it is safely absorbed therein as in the previous embodiment. Again, the tumbling action imparted to the glass pieces by the fins 49 effectively brushes the phosphor powder off the glass into suspension in the air to be continuously extracted from the housing 216 and the housing 238 by the filtration assembly 214.

Often the fluorescent tubes provided for recycling include a plastic coating thereon. The plastic coating is required according to some governmental regulations and product specifications. Although the lamp recycling apparatus disclosed herein is suitable to grind the plastic or polymeric coating on the lamps, it is preferable to score the plastic coating prior to insertion of the lamp into the apparatus. Scoring the coating on the lamp prevents the coating from collecting as a large mass of ground coating in either adjacent the drum 286 or the auger 244.

FIGS. 7–8 show a lamp scoring apparatus suitable for use in conjunction with the lamp recycling device disclosed herein, adapted to score a plastic coating on a typical fluorescent tube. The apparatus, shown generally at 400, comprises first and second conventional L-shaped angle irons 402 and 404 welded together along a vertex portion 406 thereof to define an upper cradle 414 supported on a ground surface 416 by legs 418. The cradle 414 is defined by the first angle iron 402 and the legs 418 are defined by the second angle iron 404. It will be understood that other structural configurations which define a cradle area such as that shown as 414 can be employed without departing from the scope of this invention.

Several blades 408 having a cutting surface facing into the cradle 414 are mounted at predetermined intervals along the length of the cradle 414. It has been found that the blades 408 are preferably spaced at six-inch intervals, although a larger or smaller interval is acceptable.

A conventional fluorescent tube having an elongated glass body 410 provided with an outer polymeric coating 412 is shown supported in the cradle 414. It will be understood that the blades 408 are positioned so that their cutting surfaces merely score the coating 412 on the fluorescent tube and do not extend into the cradle 414 a sufficient extent to puncture the glass body 410. The body 410 is rotated either manually or automatically about its longitudinal axis so that the blades 408 score the coating 412 thereon. Once the coating 412 has been sufficiently scored, the body 410 is inserted into a lamp recycling apparatus according to the invention as discussed herein.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. In an apparatus for separating components of light bulbs of the type having an elongated glass tube containing phosphors in gaseous or powder form, the apparatus comprising:

a receiving chamber;

an enclosed housing in communication with the receiving chamber;

an inclined auger within the housing, having a longitudinal axis and a helical screw; and at least one filter in communication with the housing wherein turbulent air flow is generated in the housing, the improvement wherein:

the auger has fins on the helical screw within the pitch of some of the threads and which extend generally parallel to the longitudinal axis.

2. The apparatus of claim 1 wherein the apparatus is mounted to a trailer for mobility.

3. The apparatus of claim 1 wherein the auger has a predetermined pitch length between successive threads and the fins on the auger extend the pitch length between threads.

4. The apparatus of claim 1 wherein the fins extend outwardly from the shaft of the auger.

5. The apparatus of claim 1 wherein the fins on the auger are formed of sector tabs which extend outwardly from the radial periphery of the threads.

6. The apparatus of claim 1 wherein the fins on the auger are mounted to the shaft and to the threads.

7. The apparatus of claim 1 wherein the fins are disposed at 90° intervals around the shaft.

8. The apparatus of claim 1 wherein the fins are disposed at 180° intervals around the shaft.

9. The apparatus of claim 1 and further comprising a hammer mill located within the receiving chamber.

10. The apparatus of claim 9 wherein the hammer mill comprises:
   a drum rotatably mounted within the receiving chamber;
   at least one vane extending radially outwardly from the drum; and
   a motor operably connected to the drum for imparting rotational motion thereto.

11. The apparatus of claim 10 wherein the receiving chamber has at least one block extending inwardly from a wall of the chamber.

12. The apparatus of claim 10 wherein the drum is operably connected to the motor by an endless belt.

13. A method for separating components of light bulbs of the type having an elongated glass tube containing phosphors in gaseous or powder form, the method comprising:
   providing an enclosed housing with an inclined auger having a longitudinal axis and a helical screw, the auger having fins on the helical screw within the pitch of some of the threads and which extend generally parallel to the longitudinal axis;
   actuating the auger and placing the elongated tube within the housing wherein the auger will fracture the tube and in conjunction with the fins will abrade the powder from the broken pieces;
   simultaneously generating turbulent airflow within the housing and extracting the air from the housing;
   filtering particulates and toxic gases from the air; and
   collecting and disposing of the fractured glass pieces.

14. The method of claim 13 and further comprising the step of mounting the enclosed housing and conducting the process on a movable trailer.

15. The method of claim 13 further comprising the step of scoring any exterior coating on the elongated tube prior to fracturing the tube.

16. The method of claim 13 further comprising the step of fracturing the tube in a hammer mill prior to placing the tube in the auger.

* * * * *